United States Patent [19]

Murakami

[11] Patent Number: 4,491,365
[45] Date of Patent: Jan. 1, 1985

[54] THIGH SUPPORT ADJUSTING MECHANISM FOR VEHICLE SEAT

[75] Inventor: Takashi Murakami, Yokohama, Japan

[73] Assignee: Nissan Motor Company, Limited, Kanagawa, Japan

[21] Appl. No.: 355,905

[22] Filed: Mar. 8, 1982

[30] Foreign Application Priority Data

Mar. 17, 1981 [JP] Japan .................... 56-37253

[51] Int. Cl.³ .................................................. A47C 1/02
[52] U.S. Cl. ................................. 297/312; 297/284; 297/423
[58] Field of Search ............... 297/312, 423, 284, 201, 297/319, 318, 322, 90, 68, 84; 74/40, 45, 48, 101, 102, 105

[56] References Cited

U.S. PATENT DOCUMENTS

| | | | |
|---|---|---|---|
| 847,880 | 3/1907 | Barker et al. | 297/319 |
| 2,749,970 | 6/1956 | Quakenbush | 297/90 X |
| 3,005,660 | 10/1961 | Winick | 297/319 X |
| 3,446,532 | 5/1969 | Cramer | 297/312 |
| 3,550,953 | 12/1970 | Neale | 297/284 X |
| 3,883,173 | 5/1975 | Shepheard et al. | 297/312 |
| 4,018,477 | 4/1977 | Hogaij | 297/284 |
| 4,324,431 | 4/1982 | Murphy et al. | 297/284 |

FOREIGN PATENT DOCUMENTS

| | | |
|---|---|---|
| 2028135 | 2/1971 | Fed. Rep. of Germany . |
| 1228432 | 5/1960 | France .................... 297/312 |
| 1474158 | 3/1967 | France . |
| 2169970 | 9/1973 | France . |
| 2446739 | 8/1980 | France . |
| 518062 | 2/1940 | United Kingdom . |

*Primary Examiner*—James T. McCall
*Attorney, Agent, or Firm*—Schwartz, Jeffery, Schwaab, Mack, Blumenthal & Koch

[57] ABSTRACT

An adjustable thigh support for an automotive vehicle seat wherein the tilting angle may be adjusted with reduced operational force. The adjusting mechanism comprises a rotatable shaft cooperative with a manually operative lever and lever structure for lifting up the thigh support in response to rotation of the rotatable shaft. The lever structure includes a member converting the rotational force applied to the rotatable shaft into a substantially horizontal reciprocating force and a member for converting the horizontal reciprocating force into a substantially vertical reciprocating force. The vertical force is applied to the thigh support for lifting up the latter. The member converting the horizontal force to vertical force is associated with a means for receiving and absorbing a vertical and downwards force working as reacting force against the operational force.

14 Claims, 15 Drawing Figures

THIGH SUPPORT ADJUSTING MECHANISM FOR VEHICLE SEAT

BACKGROUND OF THE INVENTION

The present invention relates generally to a seat assembly structure for an automotive vehicle, which seat assembly includes an adjustable thigh support. More specifically, the invention relates to a thigh support adjusting mechanism of an automotive vehicle seat which requires a relatively small adjusting force for adjustment of the tilting angle of the thigh support for selecting the best seat position.

Various constructions of vehicle seats have been developed and are available in the market. Recently vehicle seats, at least the driver's seat, are being made adjustable not only for the position of the seat with respect to steering wheel but also the seat hight, seat back support and seat cushion tilt angle. A thigh support is provided for such adjustable seats in order to provide the best foot position with respect to the vehicle pedals. Some such adjustable seats have thigh support adjusting mechanisms which are independent of the remaining seat cushion parts. For example, Japanese Patent Application No. 53-143833 which is published under Tokkai. No. Sho. 55-70214 on May 27, 1980, illustrates a thigh support structure capable of adjustment of the tilting angle independently of the remaining part of the seat cushion. The thigh support structure of Tokkai. No. Sho. 55-70214 has an adjusting mechanism including an operation lever which is manually operated and a pushing lever positioned below the thigh support section separated from remaining sections of the seat cushion so that it can be moved independently of the latter. The rotational operating force applied to the operation lever is transmitted to the pushing lever via a rotatable rod.

Figure 1:
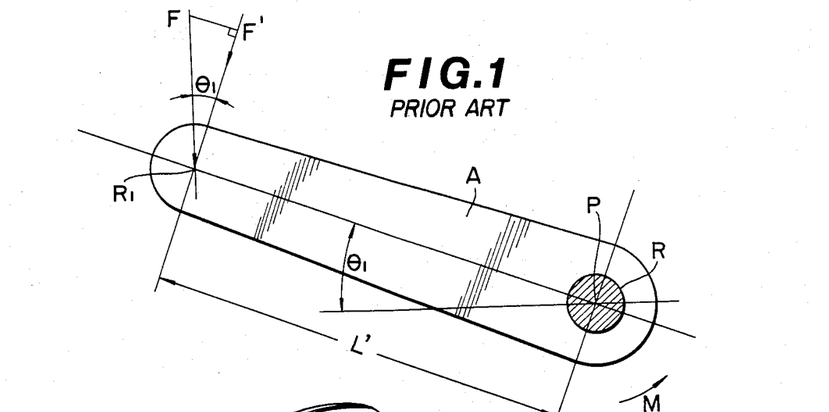
FIG. 1 is an explanatory side elevation of an actuation arm for lifting up a thigh support frame in the conventional thigh support adjusting mechanism.

In such a conventional construction, the rotational force applied to the operation lever is directly transmitted to the pushing lever, and consequently, the required adjustment force to be applied to the operation lever is relatively large. This will be more clearly understood from the following example. FIG. 1 illustrates a pushing lever A which is connected to the operation lever (not shown) via the rotatable rod R which has a longitudinal axis P serving as a rotational axis of the pushing lever A. The pushing lever A is secured to the rotatable rod R so that it may rotate with the latter in response to a rotating force applied to the operation lever.

Assume that the effective length L' of the pushing lever A is 129 mm, the tilting angle $\theta_1$ of the pushing lever A with respect to the horizontal plane is 25 degrees and the vertically applied downward force F due to weight of a passenger is 30 kg. The component F' of the force F applied perpendicular to the longitudinal axis of the pushing lever A and operating against the clockwise rotation of the pushing lever at the point $R_1$ can be obtained from $$F' = F \cdot \cos \theta_1$$

Therefore, the rotational moment M in a direction opposite to the operational rotation moment is applied in accordance with the equation $$M = F \cdot \cos \theta_1 \cdot L' = 3507 \text{ kg} \cdot \text{mm}$$

As apparent from the foregoing, the adjustment force required for adjusting the tilting angle of the thigh support is quite large.

SUMMARY OF THE INVENTION

Therefore, it is a principal object of the present invention to provide a thigh support adjusting mechanism of a vehicle seat, which can reduce the required force for adjustment of the tilting angle of the thigh support.

To achieve the above-mentioned and other objects, a thigh support adjusting mechanism, according to the present invention, comprises a member converting a rotational force applied to a manual operation lever into a substantially horizontal reciprocating force, a member converting the horizontal reciprocating force into a substantially vertical reciprocating force and a member supporting the thigh support to reduce the vertical element of counter moment against the vertical reciprocating force. Thereby, the counter force against the operational force applied to the operation lever is reduced to reduce the required adjustment force.

BRIEF DESCRIPTION OF THE DRAWINGS

The present invention will be understood more fully from the detailed description given herebelow and the accompanying drawings of the preferred embodiment of the invention, which, however, should not be taken as limitative to the invention but for elucidation and explanation only.

In the drawings.

DESCRIPTION OF THE PREFERRED EMBODIMENT

Figure 2:
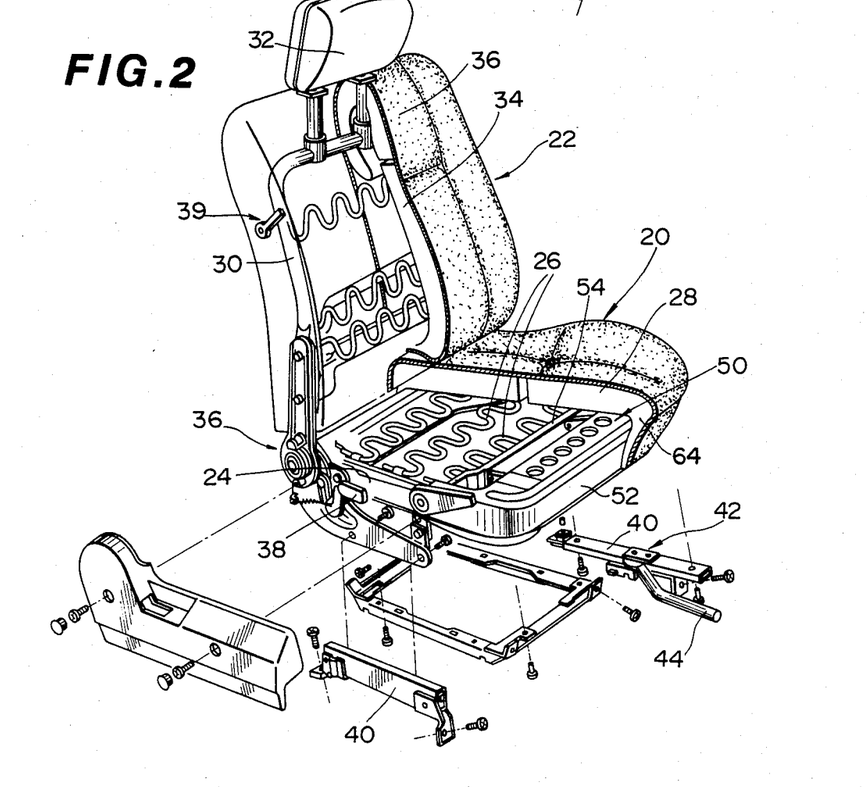
FIG. 2 is a perspective view of a vehicle seat including the preferred embodiment of a thigh support according to the present invention.
Figure 3:
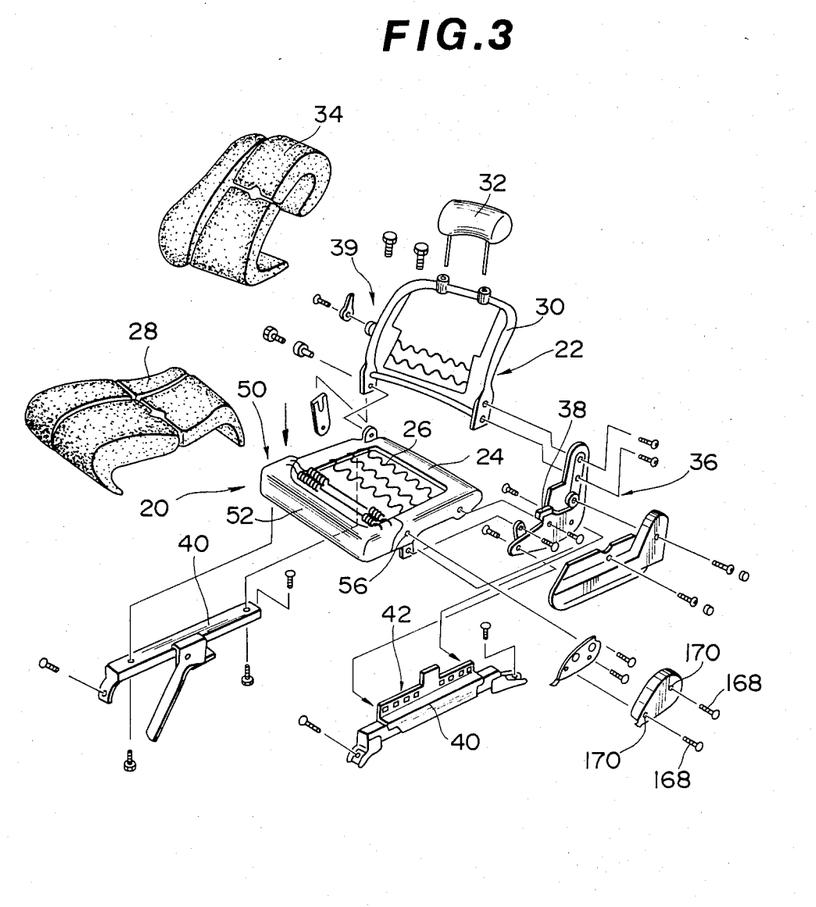
FIG. 3 is an exploded perspective view of the vehicle seat of FIG. 2.

Referring now to the drawings, particularly to FIG. 2, there is illustrated a preferred embodiment of a vehicle seat with a thigh support according to the present invention. The vehicle seat generally comprises a seat cushion 20 and a seatback 22. The seat cushion 20 has a cushion frame 24 with a plurality of laterally stretched springs 26. The cushion frame 24 is covered with a plurality of separated pieces of cushion pads 28 with an outer decorative layer made of cloth, leather and so on. Likewise, the seatback 22 has a seatback frame 30 with a head restraint 32. The seatback frame 30 is covered with a plurality of separated pieces of pads 34 with an outer decorative layer 36. The seatback frame 30 is connected to the rear end of the cushion frame 24 at the lower end thereof with a reclining mechanism 36 so that the tilting angle can be adjusted with respect to the seat cushion frame 24. The reclining control lever 38 is located at the side portion of the seat cushion adjacent the reclining mechanism. The seatback 22 is further provided with a lumbar support mechanism 39 for adjusting the firmness of the parts of the seatback which support the lumbar-vertebra area of the back.

The seat cushion 20 is slidably mounted on a pair of guide rails 40 so that it may move forward and back therealong. A latch mechanism 42 is provided to hold the seat cushion at the selected position. The latch mechanism 42 is released by operating a fore-and-aft control lever 44 provided at an appropriate position around the seat in a per se known manner.

A thigh support mechanism 50 is provided at the front of the seat cushion 20 so that it adjusts the height of the front portion of the seat cushion 20. As shown in FIGS. 2 to 11, a thigh support frame 52 is pivoted to the seat cushion frame 24 at the front end of the cushion frame 24. The thigh support frame 52 is rotatable about the pivot portion to vary the tilting angle thereof with respect to the seat cushion frame 24. A tilting angle adjusting shaft 54 is rotatably engaged with both front end cut-outs of the seat cushion frame 24 via support brackets 60 and 62 which are respectively secured onto the seat cushion frame 24. A cushion 64 separated from the remaining part of the seat cushion 20 to move independently of the remaining part is provided on the thigh support frame 52. The cushion 64 is supported by a spring 65 laterally stretched between the ends of the thigh support frame 52. The tilting angle adjusting shaft 54 has a central section 66 offset with respect to the longitudinal axis thereof defined by the two end sections 68 and 70. The end section 70 is attached to a collar 72 on which a hinge arm 76 is rotatably mounted on the tilting angle adjusting shaft 54. The hinge arm 76 is, in turn, secured to the end of the thigh support frame 52 with bolts 80, washers 82 and nuts 84 to pivotably support the rear ends of the thigh support frame 52.

To the tilting angle adjusting shaft 54, first actuation arms 86 and 88 are secured. The first actuation arms 86 and 88 are connected with second actuation arms 90 and 92 via hinge mechanisms 94. The hinge mechanisms 94 comprise respectively joint pins 96 and plane washers 98 so that each connects the first actuation arms 86, 88 to the second actuation arms 90, 92 in pivotable relationship with respect to each other. The other end of each second actuation arm 90 and 92 is engaged with the thigh support frame 52 via a guide plate 100. The guide plate 100 is formed with an elongated hole 102. Each second actuation arm 90, 92 has a connector pin 104 movably connected within the elongated hole 102. A stopper member 106 is fixedly engaged with the free end of the connector pin 104 so that it prevents the connector pin 104 from falling out of the elongated hole 102. The second actuation arms 90 and 92 have upwardly curved major section 108 and a substantially straight front end section 110 on which the connector pin 104 is provided. The second actuation arms 90 and 92 are limited in their upward movement by stopper member 112 which is provided at the upper end of side wall 114 of a roller holder 116. The stopper member 112 serves to prevent the thigh support frame 52 from moving upwardly to exceed a predetermined uppermost position. The roller holder 116 receives a roller 118 facing the lower edge of the second actuation arm 90, 92 and formed of a synthetic resin. The roller 118 is rotatably supported within the roller holder 116 with a rotation axle 120.

Figure 7:
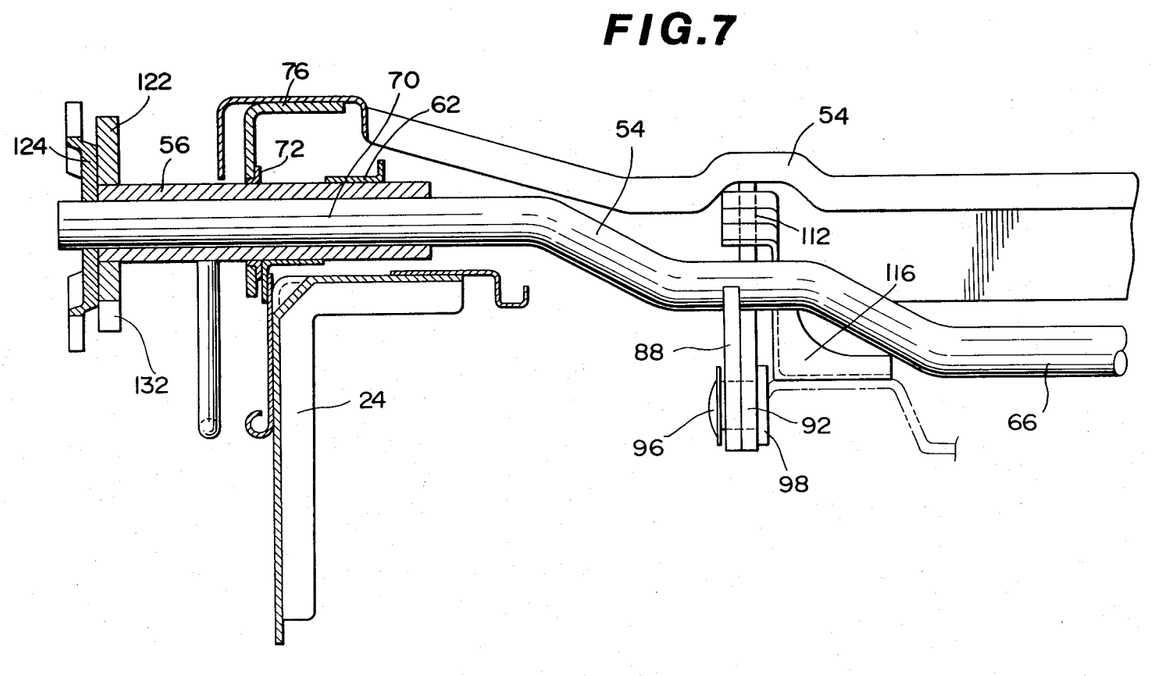
FIG. 7 is a sectional elevation of the mechanism shown in FIG. 5.
Figure 9:
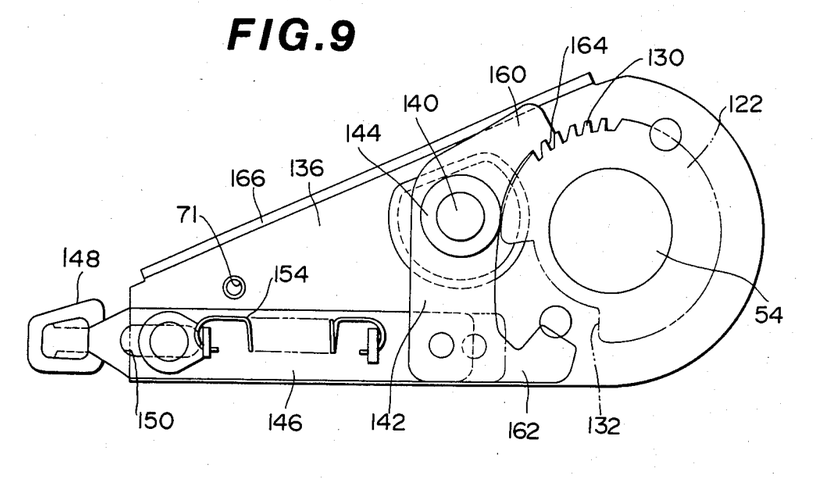
FIG. 9 is a side elevation of the operation lever means including a latching mechanism.
Figure 10:
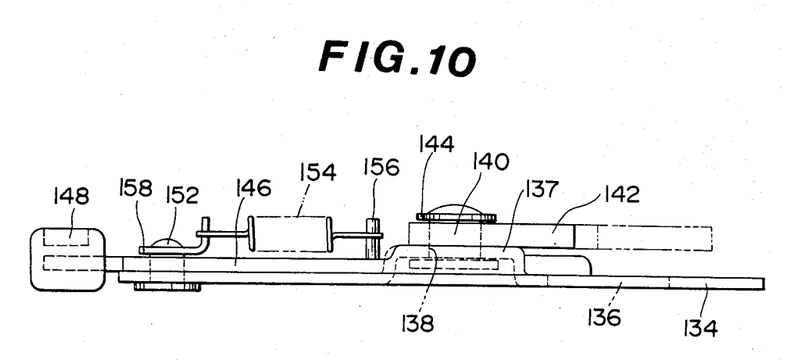
FIG. 10 is a plan view of the operation lever means with the latching mechanism of FIG. 9.
Figure 11:
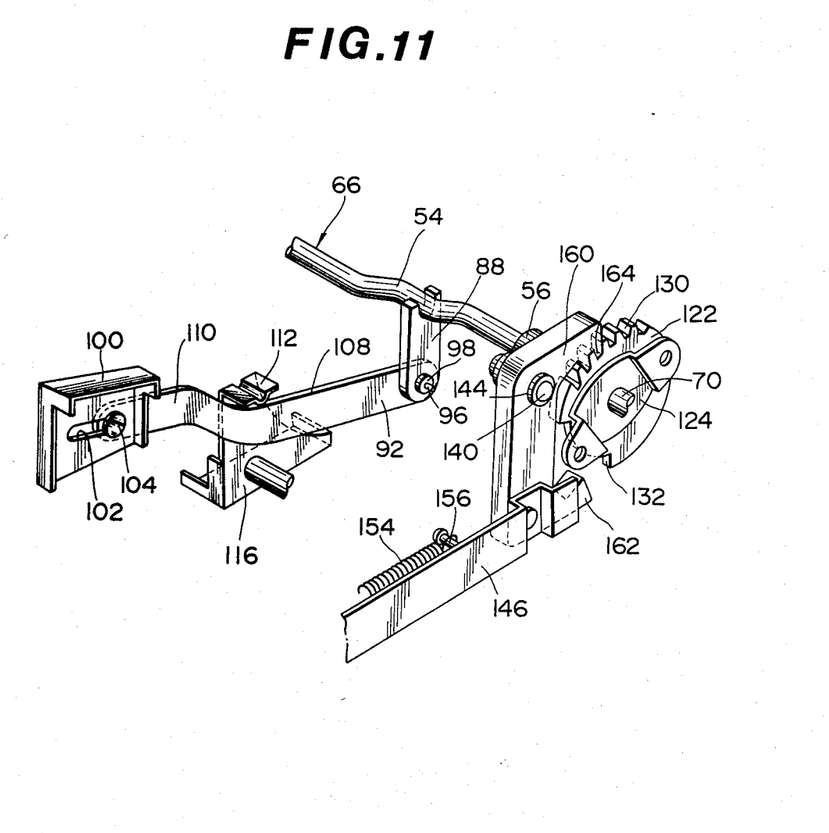
FIG. 11 is a partial perspective view showing the arm connections with the tilting angle adjusting shaft operated by the operation lever.

A gear plate 122 is mounted on the tilting angle adjusting shaft 54 via a bushing 56 (FIG. 7). Adjacent the gear plate 122, a gear retainer member 124 is provided. The gear retainer member 124 is fixedly secured onto the tilting angle adjusting shaft 54 and associated with an angle control mechanism 126. The gear plate 122 is formed with gear pawls 130 at a part of the circumference thereof and a circumferentially extending cut-out 132. As shown in FIGS. 9 and 10, the angle control mechanism 126 has a base plate 134 formed with an opening 136 to receive the end of the tilting angle adjusting shaft 54. The base plate 134 has an emboss section 137 formed with an opening 138 to receive a pivot pin 140. The pivot pin 140 rotatably secures a latch plate 142 onto the emboss section 136 of the base plate 134 with a washer 144. A slider lever 146 with a manually operated projecting part 148 is formed with an elongated opening 150 to receive a guide pin 152 secured onto the base plate 134 at a portion adjacent the front end thereof. On the other hand, the slider lever 146 is connected with the latch plate 142 in rotatable fashion so that the latch plate 142 may be rotated about the pivot pin 140 according to the longitudinal movement of the slider lever 146. The slider lever 146 is urged to a neutral position with a coil spring 154 normally pushing the slider lever to the outermost position. One end of the coil spring 154 is engaged with a projecting strip 156 extended from the sliding lever 146 and the other end of the spring is engaged with a strip 158 secured onto the guide pin 152.

The latch plate 142 has a substantially C-shaped configuration having end sections 160 and 162. The end section 160 is formed with latching pawls 164 engageable with the gear pawls 130 of the gear plate 122. The other end section 162 is adapted to engage with the cut-out 132. The latch plate 142 is pivotable about the pivot pin 140 between a latching position and unlatching position. In the latching position, the latching pawls 164 engages with the gear pawls 130 of the gear plate 122 to latch the tilting angle adjusting shaft movement.

The above-mentioned angle control mechanism 126 is received within a casing 166 which is secured onto the base plate 134 with a bolt 168 engaged with a threaded opening 170 formed in the base plate 134. The casing 166 is further secured to the end of the tilting angle adjusting shaft 54 with a fastening bolt 168 engaging with a threaded bore 182 formed on the end of the tilting angle adjusting shaft 54. Thus, the angle control mechanism 126 with the casing 166 thereof is rotated with the rotation of the tilting angle adjusting shaft 54.

Figure 4:
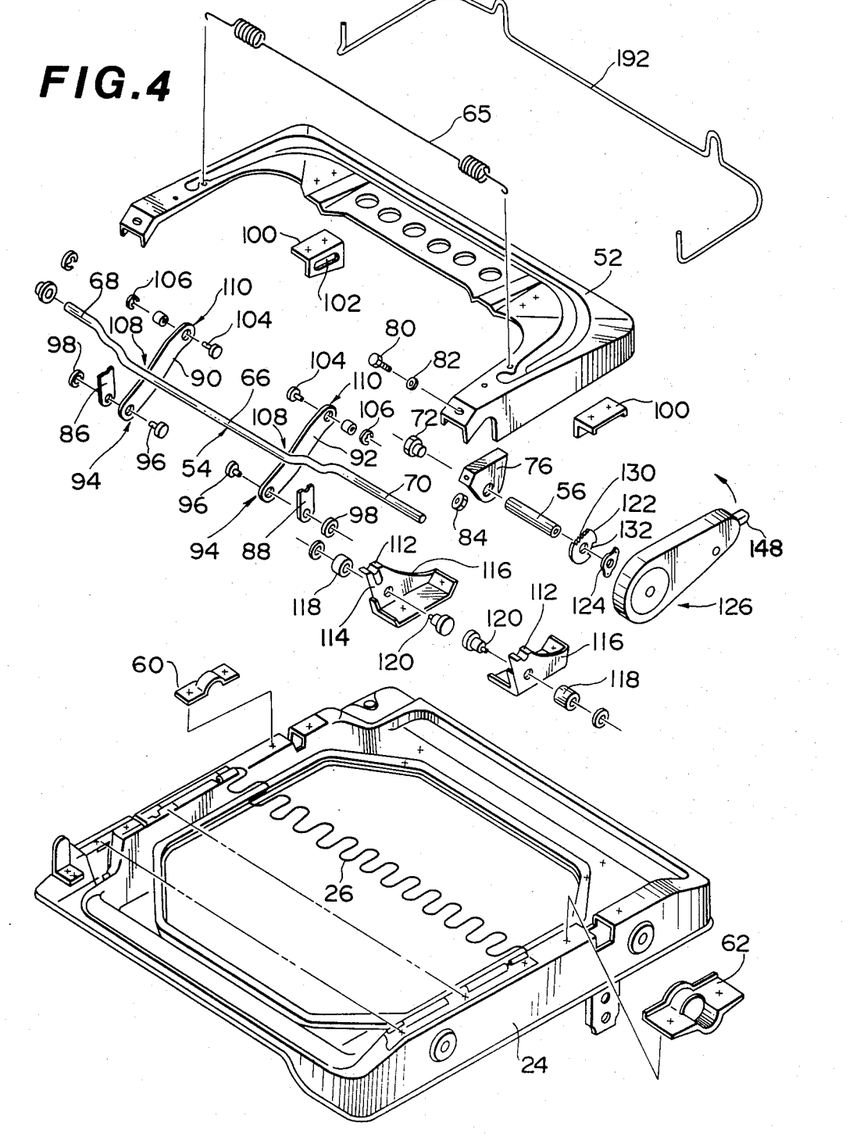
FIG. 4 is an enlarged and exploded perspective view of the vehicle seat of FIG. 2 showing a portion of the seat cushion frame.
Figure 5:
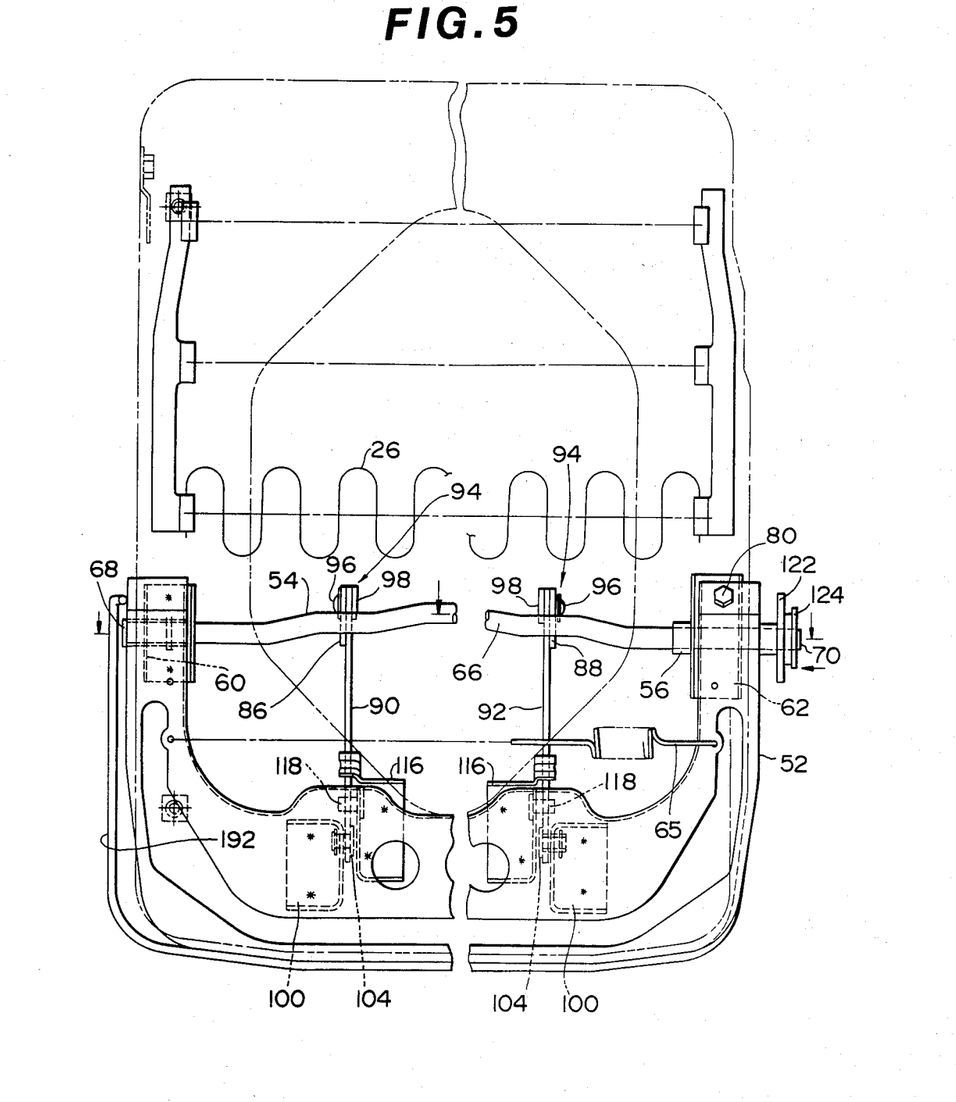
FIG. 5 is a plan view of the seat cushion portion of the vehicle seat of FIG. 2 showing the seat cushion frame with the thigh support mechanism of the preferred embodiment.
Figure 6:
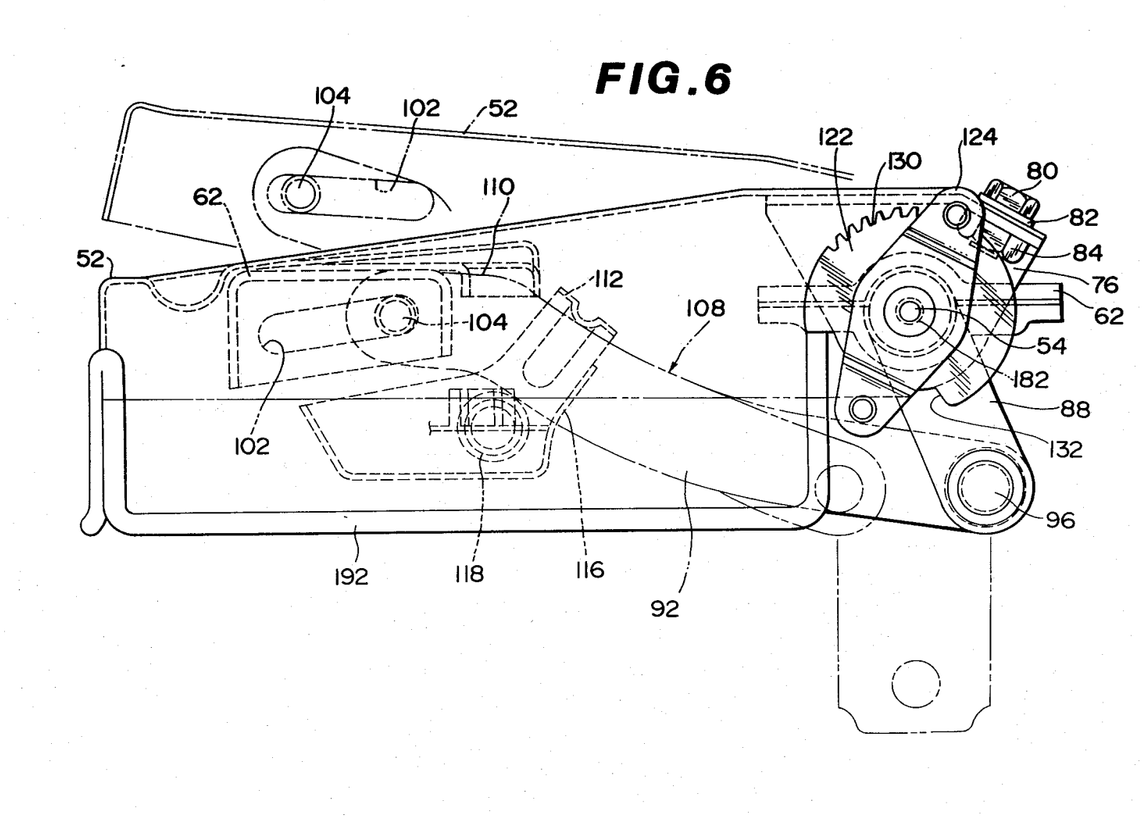
FIG. 6 is a side elevation of the seat cushion portion of FIG. 5.
Figure 8:
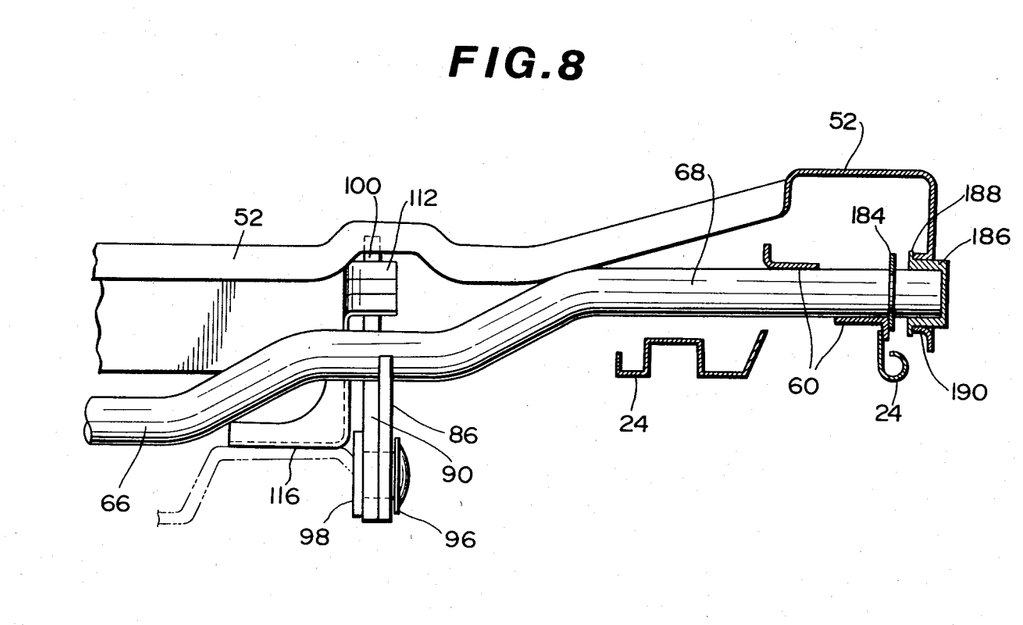
FIG. 8 is a further sectional elevation of the mechanism shown in FIG. 5.

As shown in FIGS. 4 and 8, the other end of the tilting angle adjusting shaft 54 is supported to the front end of the thigh support frame 52 through a support bracket 62 which is secured onto the thigh support frame. A stopper member 184 is engaged with the tilting angle adjusting shaft 54 so that it prevents the tilting angle adjusting shaft 54 from coming loose from the support bracket 62. A shaft collar 186 is mounted at the end of the tilting angle adjusting shaft 54. The shaft collar 186 has a flange 188 mating with a bent flange section 190 of the thigh support frame 52. In the drawings, the reference numeral 192 (FIG. 4) denotes a trim wire secured to the thigh support frame 52 at both ends thereof.

Figure 12:
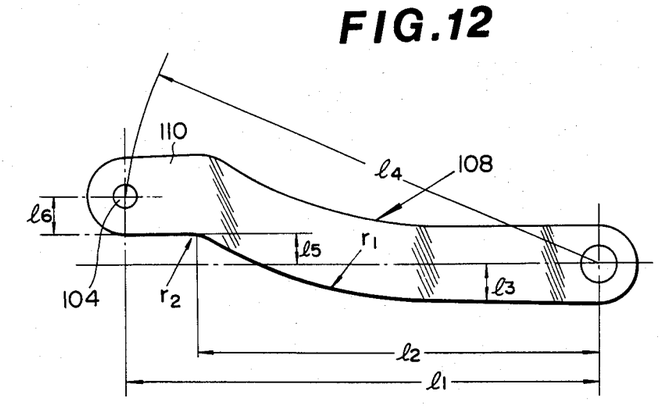
FIG. 12 shows a second actuation arm to show the dimensions of each section thereof.

One may assume certain dimensional relationships to make the following explanation easier to understand. As shown in FIG. 12, preferred dimensions of each element of the second actuation arms 90, 92 are as follows:

$l_1 = 128$ mm
$l_2 = 108$ mm
$l_3 = 10$ mm
$l_4 = 129 \pm 0.2$ mm
$l_5 = 6.5$ mm
$l_6 = 15$ mm
$r_1 = 130$ mm
$r_2 = 20$ mm

For adjusting the tilting angle of the thigh support, the slider lever 146 is moved toward the latch plate 142 against the spring force normally biasing the slider lever 146 by depressing the projecting part 148. According to the depressing of the projecting part 148 and the movement of the slider lever 146, the latch plate 142 is rotated about the pivot pin 140 counterclockwise to release the latching pawls 164 from the gear pawls 130 the gear plate 122. By releasing of the latching pawls 164 from the gear pawls 130, the thigh support frame 52 together with the angle control mechanism 126 and the tilting angle adjusting shaft 54 can be rotated about the rotational axis of the tilting angle adjusting shaft. By rotation of angle control mechanism 126 which causes rotation of the tilting angle adjusting shaft 54, the first actuation arms 86 and 88 are rotated about the tilting angle adjusting shaft clockwise or counterclockwise. When the thigh support is raised, the first actuation arms 86 and 88 are rotated clockwise as viewed in FIG. 6 to move the second actuation arms 90 and 92 frontwardly. Since the lower edges of the second actuation arms 90 and 92 are respectively supported by the rollers 118 and in turn is limited upward movement by the stopper member 112, the front ends of the second actuation arms 90 and 92 are gradually raised up according to the curve angle provided in the second actuation arms 90 and 92. The connector pins 104 of the second actuation arms 90 and 92 move along the elongated holes 102 to account for horizontal positional variation of the second actuation arms 90 and 92 according to the movement of the first actuation arms 86 and 88. By movement of the second actuation arms 90 and 92, the guide plate 100 secured onto the thigh support frame 52 is pushed upwardly to increase the tilting angle of the thigh support.

After adjusting the tilting angle of the thigh support, the projecting part 148 is released from the depressing force to enable the slider lever 146 to return to the neutral position under the biasing force of the coil spring 154. By movement of the slider lever 146 away from the latch plate 142, the latch plate 142 is pulled to rotate about pivot pin 140 clockwise to engage the latching pawls 164 with the gear pawls 130 of the gear plate 122. Thus, the tilting angle adjusting shaft 54, the first actuation arms 86 and 88 and the second actuation arms 90 and 92 are latched in the selected position to maintain the selected tilting angle of the thigh support.

Figure 13:
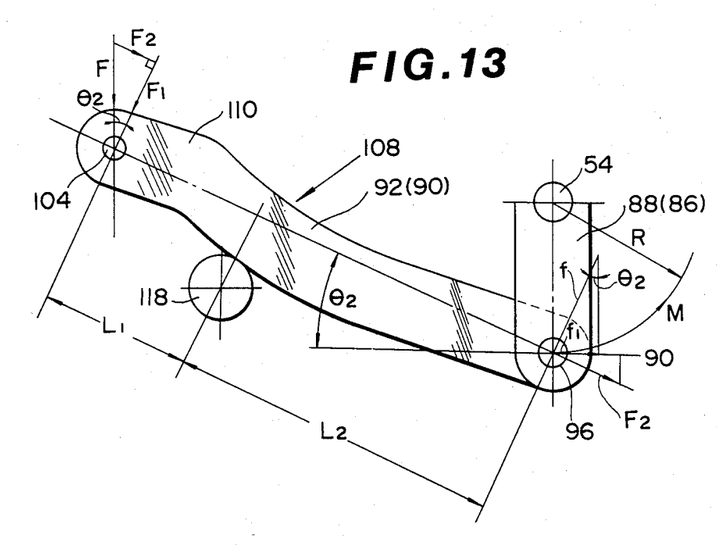
FIG. 13 shows the relationship of the first and second actuation arms in a position adjusting the tilting angle of the thigh support.

Here, assuming gravity force F which is the total weight of the thigh support frame 52, the passenger's weight partly applied to the thigh support portion and so on, is applied, as shown in FIG. 13, forces applied to each perpendicular to the upper edge of the second actuation arm 90, 92 and axial force applied parallel to the longitudinal axis of the second actuation arms 90 and 92 are obtained from the following formulas:

$$F_1 = F \cdot \cos \theta_2$$

$$F_2 = F \cdot \sin \theta_2$$

$$F_1 \cdot L_1 = f \cdot L_2$$

$$\therefore f = \frac{F \cdot \cos \theta_2 \cdot L_1}{L_2}$$

$$\therefore f_1 = f \cdot \sin \theta_2 = \frac{F \cdot \cos \theta_2 \cdot L_2 \cdot \sin \theta_2}{L_2}$$

$$M = f_1 \cdot R + F_2 \cdot \cos \theta_2 \cdot R$$

$$M = \left( \frac{F \cdot \cos \theta_2 \cdot L_1 \cdot \sin \theta_2}{L_2} + F \cdot \sin \theta_2 \cdot \cos \theta_2 \right) R$$

$$M = F \cdot \sin \theta_2 \cdot \cos \theta_2 \left( \frac{L_1}{L_2} + 1 \right) \cdot R$$

$$M = \frac{F \cdot \sin 2\theta_2 \cdot R}{2} \left( \frac{L_1}{L_2} + 1 \right)$$

Here, further assuming $\theta = 25°$, $R = 40$ mm, $L_1 = 43$ mm and $L_2 = 86$ mm, the operation force-moment M required for lifting up the front end of the second actuation arms 90 and 92 is M = 689 kg-mm from the above formulas, in the position of FIG. 13. As understood herefrom, the input force applied to the first actuation arms 86 and 88 is independent of the length of the second actuation arms 90 and 92 but is determined by the angle $\theta_2$ and dimensional relationship of $L_1$ and $L_2$ from the rollers 118 serving as supports therefor. Therefore, if the rollers 118 are located closer to the front ends of the second actuation arms 90 and 92 than the dimension between the rollers and the rear ends of the second actuation arms, the force moment M necessary to operate the lever becomes relatively small.

Figure 14:
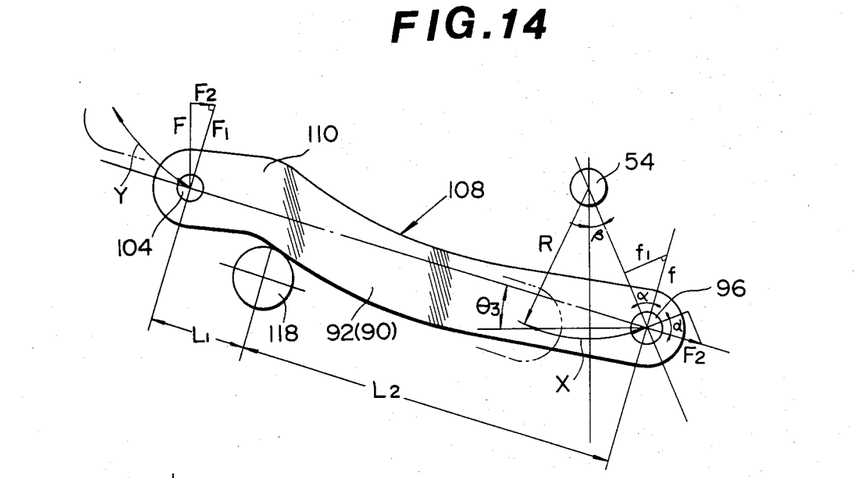
FIG. 14 shows a similar relationship to that shown in FIG. 13 but showing a arm position where the first arm longitudinal axis is tilting away from the thigh support.

Consider the arm position as shown in FIG. 14 in which the first actuation arms 86 and 88 are rotated to place the rear ends of the second actuation arms 90 and 92 in a rearwardly offset position, an angle $\beta$ defined by vertical line V extending through a center of the tilting angle adjusting shaft 54 and a longitudinal axis of the first actuation arms 86 and 88. In this position, the angle $\beta$ may be considered for determining the operational force with respect to the gravity applied to the front end of the second actuation arms 90 and 92. Therefore, the above formulas are modified as follows:

$$F_1 = F \cdot \cos \theta_3$$

$$F_2 = F \cdot \sin \theta_3$$

$$F_1 \cdot L_1 = f \cdot L_2$$

$$f_1 = f \cdot \sin \alpha = f \cdot \sin(\theta_3 + \beta)$$

$$M = f_1 \cdot R + F_2 \cos \alpha \cdot R$$

$$= f \cdot \sin(\theta_3 + \beta) \cdot R + F \cdot \sin \theta_3 \cdot \cos(\theta_3 + \beta) \cdot R$$

$$= \frac{F \cdot \cos \theta_3 \cdot L_1 \cdot \sin(\theta_3 + \beta) \cdot R}{L_2} + F \cdot \sin \theta_3 \cdot \cos(\theta_3 + \beta) \cdot R$$

Assuming $\theta_3 = 17°$, $\beta_1 = 22.5°$, $R = 40$ mm, $L_1 = 26$ mm, $L_2 = 103$ mm and $F = 30$ kg, the operational moment of force M to be applied to the tilting angle adjusting shaft 54 is $M = 455$ kg-mm.

Figure 15:
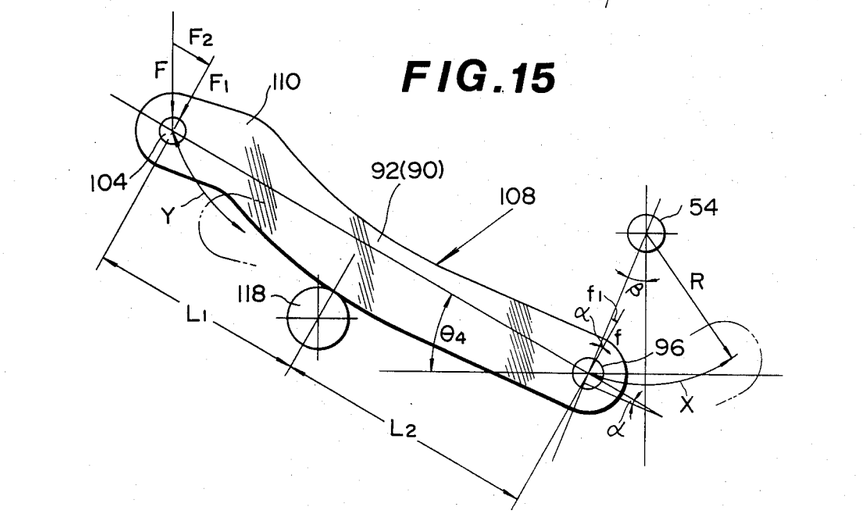
FIG. 15 shows a similar relationship to that shown in FIG. 13 but showing a position where the longitudinal axis of the first arm is tilted towards the thigh support.

In the position as shown in FIG. 15, the front ends of the second actuation arms 90 and 92 are positioned at the uppermost position, and the axis of the joint pins 96 connecting the first and second actuation arms is positioned forward of the axis of the tilting angle adjusting shaft 54 at an offset angle $\beta_2$. In this arm position, the force moment required can be obtained from the following formulas:

$$M = \frac{F \cdot \cos \theta_4 \cdot L_1 \cdot \sin(\theta_4 - \beta_2) \cdot R}{L_2} + F \cdot \sin \theta_4 \cdot \cos(\theta_4 - \beta) \cdot R$$

Here, assuming $\theta = 29°$, $\beta_2 = 22.5°$, $R = 40$ mm, $L_1 = 58$ mm, $L_2 = 71$ mm, and $F = 30$ kg, the required moment of force is $M = 679$ kg-mm.

As apparent herefrom, the force required for adjusting the tilting angle of the thigh support is remarkably reduced thereby enabling easy adjustment of the tilting angle.

What is claimed is:

1. A thigh support for an automotive vehicle seat comprising:
   a vehicle seat including a seat frame;
   a thigh support frame provided adjacent the front end of said seat frame and pivoted thereto;
   a manually operable lever means for manually adjusting the tilting angle of said thigh support frame, which lever means receives rotational force moment for variation of the angular position corresponding to the desired angular position of said thigh support frame;
   first means, associated with said lever means, for converting the rotational force moment into essentially horizontal force for movement in essentially horizontal direction at a magnitude corresponding to the angular variation of said lever means; and
   second means, associated with said first means, for converting the essentially horizontal force to essentially vertical lifting force for lifting up the free end of said thigh support frame to vary the tilting angle of the thigh support frame about said pivoted portion at a magnitude corresponding to the magnitude of the angular variation of said lever means.

2. A thigh support as set forth in claim 1, which further comprises third means for receiving downward force applied to said thigh support to absorb at least the vertical component thereof.

3. A thigh support as set forth in claim 2, which further comprises fourth means for defining an uppermost position of said thigh support frame and preventing the thigh support frame upward movement fron exceeding said uppermost position.

4. A thigh support for a vehicle seat comprising:
   a thigh support frame pivotedly mounted to a frame of said seat;
   an adjusting shaft for adjusting the tilting angle of said thigh support frame with respect to said seat frame, said adjusting shaft having both ends thereof rotatably engaged with said seat frame;
   a manually operative lever assembly engaged with one end of said adjusting shaft for rotating the shaft,
   a latching means, incorporated with said lever assembly, for latching said lever assembly at a selected rotational position to maintain the shaft at a rotated position corresponding to the position of the lever assembly;
   a linkage connecting said thigh support frame and said adjusting shaft so that the tilting angle of said thigh support frame may be adjusted, the tilting angle with respect to said seat frame corresponding to the rotation of said adjusting shaft, said linkage including a first member converting the rotation of adjusting shaft into a substantially horizontal reciprocating motion, a second member converting the horizontal reciprocating motion into a substantially vertical reciprocating motion for lifting the free end of said thigh support frame and a third member damping against a downward force acting on said second member as reaction force with respect to vertical reciprocating motion of the latter.

5. The thigh support as set forth in claim 4, wherein said adjusting shaft include means for amplifying rotational motion to increase horizontal element of rotation to be transmitted to said first member.

6. The thigh support as set forth in claim 5, wherein said second member is rotatably connected with said first member and is rotatably connected with the thigh support frame.

7. The thigh support as set forth in claim 6, wherein said second member has an upwardly curved portion in cooperating with said first and third members for converting the horizontal motion of said second member into vertical motion thereof to vertically lift the free end of said thigh support frame.

8. The thigh support as set forth in claim 4, 5, 6 or 7, wherein said third member is supported on said seat frame at a position close to the free end of said thigh support frame and relatively far from said adjusting shaft.

9. The thigh support as set forth in claim 4, wherein said adjusting shaft has a portion thereof bent radially outwardly and said first member is connected at said bent portion to said shaft for amplifying said horizontal component of said second member.

10. The thigh support as set forth in claim 9, wherein said third member is a roller engaging the lower edge of said second member and rotatably supported on the seat frame.

11. The thigh support as set forth in claim 10, wherein said third member includes means for limiting upward motion of said second member away from said roller.

12. The thigh support as set forth in claim 4, wherein said latch mechanism includes a first latching member fixedly mounted at one end of said adjusting shaft and a second latching member incorporated with said lever assembly and movable between a first position engaging with said first latching member for latching the shaft rotation and a second position disengaging from said first latching member for unlatching same.

13. The thigh support as set forth in claim 12, wherein said second latching member is associated with a manually operable unlatching lever in said lever assembly to move between said first and second positions.

14. A thigh support for an automotive vehicle seat comprising:
- a seat frame including a thigh support frame provided adjacent the front end of the seat and pivotable about an essentially transverse pivot axis;
- a manually operable lever means for adjusting the tilting angular position of said thigh support frame and applying a rotational force moment for angular variation of said position at a magnitude corresponding to a desired tilting angular position of said thigh support frame;
- a first link means, associated with said lever means, for moving in essentially horizontal direction at a magnitude corresponding to the angular variation of said lever means; and
- a second link means, associated with said first link means, for causing essentially vertical movement of the front end portion of said thigh support frame at a magnitude corresponding to the magnitude of the essentially horizontal movement of said first link means for varying the tilting angular position of said thigh support frame.

* * * * *